United States Patent
Wan et al.

(10) Patent No.: US 12,413,178 B2
(45) Date of Patent: Sep. 9, 2025

(54) ROTATION SYSTEM AND CONTROLLER FOR PHOTOVOLTAIC TRACKER

(71) Applicant: Huawei Digital Power Technologies Co., Ltd., Shenzhen (CN)

(72) Inventors: Song Wan, Shanghai (CN); Qinwei Liu, Shenzhen (CN); Wuben Sun, Shanghai (CN); Yanzhong Zhang, Shanghai (CN); Kai Liu, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 41 days.

(21) Appl. No.: 18/160,163

(22) Filed: Jan. 26, 2023

(65) Prior Publication Data
US 2023/0170842 A1    Jun. 1, 2023

Related U.S. Application Data

(63) Continuation of application No. PCT/CN2021/093873, filed on May 14, 2021.

(30) Foreign Application Priority Data

Jul. 27, 2020    (CN) .......................... 202010733514.3

(51) Int. Cl.
| | |
|---|---|
| H02S 20/32 | (2014.01) |
| F24S 30/425 | (2018.01) |
| F24S 40/20 | (2018.01) |
| G05D 3/10 | (2006.01) |
| G06V 10/764 | (2022.01) |

(Continued)

(52) U.S. Cl.
CPC ............ *H02S 20/32* (2014.12); *F24S 30/425* (2018.05); *F24S 40/20* (2018.05); *G05D 3/105* (2013.01); *G06V 10/764* (2022.01); *G06V 10/774* (2022.01); *H02S 40/10* (2014.12); *H02S 40/12* (2014.12); *H02S 40/30* (2014.12)

(58) Field of Classification Search
None
See application file for complete search history.

(56) References Cited

U.S. PATENT DOCUMENTS

| | | | | |
|---|---|---|---|---|
| 2009/0277496 | A1* | 11/2009 | Khazeni | .............. H01L 31/0547 136/246 |
| 2018/0331654 | A1* | 11/2018 | Gostein | .................... H02S 50/00 |
| 2019/0372513 | A1* | 12/2019 | Gross | ....................... H02S 40/22 |

FOREIGN PATENT DOCUMENTS

| | | |
|---|---|---|
| CN | 101718996 A | 6/2010 |
| CN | 104901612 A | 9/2015 |

(Continued)

*Primary Examiner* — Ryan S Cannon
(74) *Attorney, Agent, or Firm* — Slater Matsil, LLP

(57) ABSTRACT

An image/video capture apparatus is provided, to capture image data of a photovoltaic panel (101) and surroundings, and a controller (502) recognizes a category corresponding to the image data, and generates different instructions to control rotation of a photovoltaic tracker (102), to remove dust or snow accumulating on the photovoltaic panel (101). This does not need continuous heating, but is simple and efficient, saves electric energy, and resolves a technical problem that a conventional snow removal method of heating has low efficiency and wastes electric energy. In addition, a corresponding controller (1200) is further provided.

20 Claims, 9 Drawing Sheets

(51) Int. Cl.
  *G06V 10/774* (2022.01)
  *H02S 40/10* (2014.01)
  *H02S 40/12* (2014.01)
  *H02S 40/30* (2014.01)

(56) References Cited

FOREIGN PATENT DOCUMENTS

| | | |
|---|---|---|
| CN | 105939146 A | 9/2016 |
| CN | 106571774 A | 4/2017 |
| CN | 104463196 B | 7/2017 |
| CN | 206481263 U | 9/2017 |
| CN | 206515703 U | 9/2017 |
| CN | 107703814 A | 2/2018 |
| CN | 107885235 A | 4/2018 |
| CN | 108418546 A | 8/2018 |
| CN | 108710954 A | 10/2018 |
| CN | 208226970 U | 12/2018 |
| CN | 109615629 A | 4/2019 |
| CN | 109728780 A | 5/2019 |
| CN | 109740495 A | 5/2019 |
| CN | 109802632 A | 5/2019 |
| CN | 106684924 B | 9/2019 |
| KR | 20110050157 A | 5/2011 |
| KR | 101171853 B1 | 8/2012 |
| KR | 102114375 B1 | 6/2020 |
| WO | 2019244146 A1 | 12/2019 |

\* cited by examiner

ROTATION SYSTEM AND CONTROLLER FOR PHOTOVOLTAIC TRACKER

CROSS-REFERENCE TO RELATED APPLICATIONS

This application is a continuation of International Application No. PCT/CN2021/093873, filed on May 14, 2021 which claims priority to Chinese Patent Application No. 202010733514.3, filed on Jul. 27, 2020. The disclosures of the aforementioned applications are hereby incorporated by reference in their entireties.

TECHNICAL FIELD

Embodiments of this application relate to the field of photovoltaic technologies, and in particular, to a rotation system and a controller for a photovoltaic tracker.

BACKGROUND

As new energy power generation gradually matures, a photovoltaic market in China rapidly rises, and photovoltaic plants are widely distributed in China. In a northern region, the winter is long, which has a low temperature and abundant snowfall.

The snowfall has serious impact on a photovoltaic plant, as snow accumulates on a photovoltaic module, resulting in an electricity loss in photovoltaic power generation. When snow accumulates heavily, the accumulating snow may crush the photovoltaic module or cause the photovoltaic module to collapse.

Currently, in the photovoltaic plant, the photovoltaic module may be heated to achieve an objective of snow removal. However, in this manner, heating efficiency is relatively low, and continuous heating is required during snowfall, which wastes electric energy, and has a poor snow removal effect.

SUMMARY

Embodiments of this application provide a rotation system and a controller for a photovoltaic tracker, to resolve a technical problem that a conventional snow removal method of heating has low efficiency and wastes electric energy.

According to a first aspect, an embodiment of this application provides a rotation system for a photovoltaic tracker, including a controller, a photovoltaic tracker, a photovoltaic panel, and an image/video capture apparatus. The photovoltaic panel is mounted on the photovoltaic tracker, and the photovoltaic panel can rotate with the photovoltaic tracker. The controller is configured to: obtain image data from the image/video capture apparatus, and generate different instructions based on a category corresponding to the image data. The instructions are used to control rotation of the photovoltaic tracker, to remove dust or snow accumulating on the photovoltaic panel.

In this embodiment of this application, the image/video capture apparatus captures image data of the photovoltaic panel and surroundings, and the controller recognizes a category corresponding to the image data, and generates different instructions to control rotation of the photovoltaic tracker, to remove dust or snow accumulating on the photovoltaic panel. This does not need heating, but is simple and efficient, and resolves a technical problem that a conventional snow removal method of heating has low efficiency and wastes electric energy.

With reference to the first aspect, in an implementation of this embodiment of this application, the system further includes a data acquisition device. The data acquisition device is connected to the photovoltaic tracker and the image/video capture apparatus. The data acquisition device may receive the image data of the image/video capture apparatus and transmit the instructions to the photovoltaic tracker to implement data interconnection.

With reference to the first aspect, in an implementation of this embodiment of this application, the system further includes an inverter. The data acquisition device is connected to the photovoltaic tracker by using the inverter, or the data acquisition device is directly connected to the photovoltaic tracker. The data acquisition device may be connected to the photovoltaic tracker in the two manners, which improves compatibility of the system, and can be applied to different types of photovoltaic tracker systems.

With reference to the first aspect, in an implementation of this embodiment of this application, the system further includes a network device and a central control computer device. The central control computer device is connected to the data acquisition device by using the network device; or the central control computer device is connected to the image/video capture apparatus by using the network device. The central control computer device may obtain image data in the image/video capture apparatus in a plurality of manners, for example, obtain the image data by connecting to the image/video capture apparatus by using the network device or the data acquisition device. Alternatively, the central control computer device may be directly connected to the image/video capture apparatus by using the network device, obtain the image data. These manners may be applied to different actual situations.

With reference to the first aspect, in an implementation of this embodiment of this application, the controller is disposed in the image/video capture apparatus, the data acquisition device, or the central control computer device. A deployment location of the controller may be set depending on an actual situation. If the controller is deployed inside the image/video capture apparatus, the controller may directly obtain image data of the image/video capture apparatus, and after generating an instruction, forward the instruction to the photovoltaic tracker by using the data acquisition device. If the controller is deployed inside the data acquisition device, the controller may obtain image data of the image/video capture apparatus by using the data acquisition device, and after generating an instruction, send the instruction to the photovoltaic tracker by using the data acquisition device. If the controller is deployed inside the central control computer device, the controller may obtain image data from the image/video capture apparatus by using the central control computer, the network device, and the data acquisition device, and after generating an instruction, forward the instruction to the photovoltaic tracker by using the central control computer, the network device, and the data acquisition device.

With reference to the first aspect, in an implementation of this embodiment of this application, if the category corresponding to the image data is snowfall or hailing, the controller is configured to generate a first instruction. The first instruction is used to instruct the photovoltaic tracker to adjust to a preset tilt angle. When snow falls or hail falls, the controller can recognize it by using image data, and generate the first instruction to instruct the photovoltaic tracker to adjust to the preset tilt angle. After the photovoltaic tracker is adjusted to the preset tilt angle, an amount of snowfall received by the photovoltaic panel can be reduced, and snow or hail accumulating on the photovoltaic panel can fall off more easily, thereby achieving snow avoidance and snow removal effects. In addition, an impact force of hail falling on a module surface can be reduced, to reduce a risk of damaging the photovoltaic panel.

With reference to the first aspect, in an implementation of this embodiment of this application, if the category corresponding to the image data is rainfall and dust accumulation, the controller is configured to generate a second instruction. The second instruction is used to instruct the photovoltaic tracker to rotate to a preset angle or repeatedly rotate n times, and n is an integer greater than or equal to 1. When rain falls and dust accumulates, the controller can recognize it by using image data, and instruct the photovoltaic tracker to rotate to the preset angle or repeatedly rotate n times, so that rainwater washes the dust accumulating on the photovoltaic panel, thereby achieving a dust removal effect.

With reference to the first aspect, in an implementation of this embodiment of this application, the controller is configured to: obtain video data from the image/video capture apparatus, and extract the image data from the video data at a preset time interval. In a case, if the image/video capture apparatus is an apparatus for shooting a video, the controller may convert shot video data into image data in a sample frame extraction manner.

With reference to the first aspect, in an implementation of this embodiment of this application, the controller is further configured to recognize, based on the image data by using a trained neural network model, the category corresponding to the image data. In some cases, the controller may recognize the image data by using a neural network. In actual application, another manner may alternatively be used for recognition.

With reference to the first aspect, in an implementation of this embodiment of this application, the system further includes a model training apparatus. The model training apparatus is configured to: obtain image data for training, classify and marking on the image data for training to obtain a training category of the image data, and train a neural network model based on the image data for training and the training category by using a training algorithm, to obtain the trained neural network model.

According to a second aspect, an embodiment of this application provides a controller for a photovoltaic tracker. The controller is configured to perform the following steps: obtaining image data; and generating different instructions based on a category corresponding to the image data. The instructions are used to control rotation of a photovoltaic tracker, to remove dust accumulating on a photovoltaic panel or reduce snow accumulating on a surface of the photovoltaic panel, the photovoltaic panel is mounted on the photovoltaic tracker, and the photovoltaic panel can rotate with the photovoltaic tracker.

With reference to the second aspect, in an implementation of this embodiment of this application, if the category corresponding to the image data is snowfall or hailing, the controller is configured to generate a first instruction. The first instruction is used to instruct the photovoltaic tracker to adjust to a preset tilt angle.

With reference to the second aspect, in an implementation of this embodiment of this application, if the category corresponding to the image data is rainfall and dust accumulation, the controller is configured to generate a second instruction. The second instruction is used to instruct the photovoltaic tracker to rotate to a preset angle or repeatedly rotate n times, and n is an integer greater than or equal to 1.

With reference to the second aspect, in an implementation of this embodiment of this application, the controller is further configured to recognize, based on the image data by using a trained neural network model, the category corresponding to the image data.

With reference to the second aspect, in an implementation of this embodiment of this application, the neural network model is obtained through training in the following steps: obtaining image data for training; performing classification and marking on the image data for training to obtain a training category of the image data; and training a neural network model based on the image data for training and the training category by using a training algorithm, to obtain the trained neural network model.

With reference to the second aspect, in an implementation of this embodiment of this application, training steps of the neural network model further include: obtaining image data for verification, and performing classification and marking on the image data for verification, to obtain a verification category of the image data; obtaining, based on the image data for verification, a recognized category of the image data through recognition by using the trained neural network model; and determining an accuracy rate of the trained neural network model based on the verification category and the recognized category.

With reference to the second aspect, in an implementation of this embodiment of this application, the controller is configured to: obtain video data; and extract the image data from the video data at a preset time interval.

With reference to the second aspect, in an implementation of this embodiment of this application, the controller is further configured to: remove the image data whose image brightness is less than a preset threshold.

It can be learned from the foregoing technical solutions that embodiments of this application have the following advantages:

In the embodiments of this application, the image/video capture apparatus captures image data of the photovoltaic panel and surroundings, and the controller recognizes a category corresponding to the image data, and generates different instructions to control rotation of the photovoltaic tracker, to remove dust or snow accumulating on the photovoltaic panel. This does not need continuous heating, but is simple and efficient, saves electric energy, and resolves a technical problem that a conventional snow removal method of heating has low efficiency and wastes electric energy. In addition, this application further provides a corresponding controller.

DETAILED DESCRIPTION OF ILLUSTRATIVE EMBODIMENTS

Embodiments of this application provide a rotation system and a controller for a photovoltaic tracker, to resolve a technical problem that a conventional snow removal method of heating has low efficiency and wastes electric energy.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of this application described herein can be implemented in other orders than the order illustrated or described herein. In addition, the terms "include", "correspond to" and any other variant mean to cover non-exclusive inclusion. For example, a process, method, system, product, or device that includes a list of steps or units is not necessarily limited to those expressly listed steps or units, but may include other steps or units not expressly listed or inherent to such a process, method, system, product, or device.

In addition, in embodiments of this application, the word "exemplary" or "for example" is used to represent giving an example, an illustration, or a description. Any embodiment or design scheme described as an "example" or "for example" in the embodiments of this application shall not be explained as being more preferred or having more advantages than another embodiment or design scheme. Exactly, use of the word "example", "for example", or the like is intended to present a related concept in a specific manner.

Figure 1:
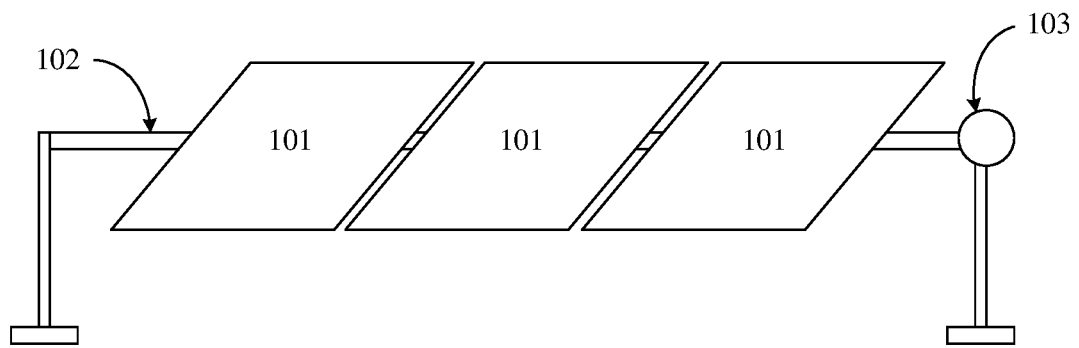
FIG. 1 is a schematic diagram 1 of a photovoltaic module in a photovoltaic plant according to an embodiment of this application.

FIG. 1 is a schematic diagram 1 of a photovoltaic module in a photovoltaic plant according to an embodiment of this application. In some embodiments, the photovoltaic module generally includes a photovoltaic panel 101, a photovoltaic tracker 102, and a rotation control module 103 on the photovoltaic tracker 102. The photovoltaic panel 101 is mounted on the photovoltaic tracker 102, and the rotation control module 103 is disposed on the photovoltaic tracker 102, and configured to control rotation of a rotating rod that is on the photovoltaic tracker 102 and that is connected to the photovoltaic panel 101, to rotate the photovoltaic panel 101. In some embodiments, the rotation control module 103 may be a motor configured to drive the rotating rod to rotate, or may be a component of another type. This is not limited in this embodiment of this application.

Figure 2:
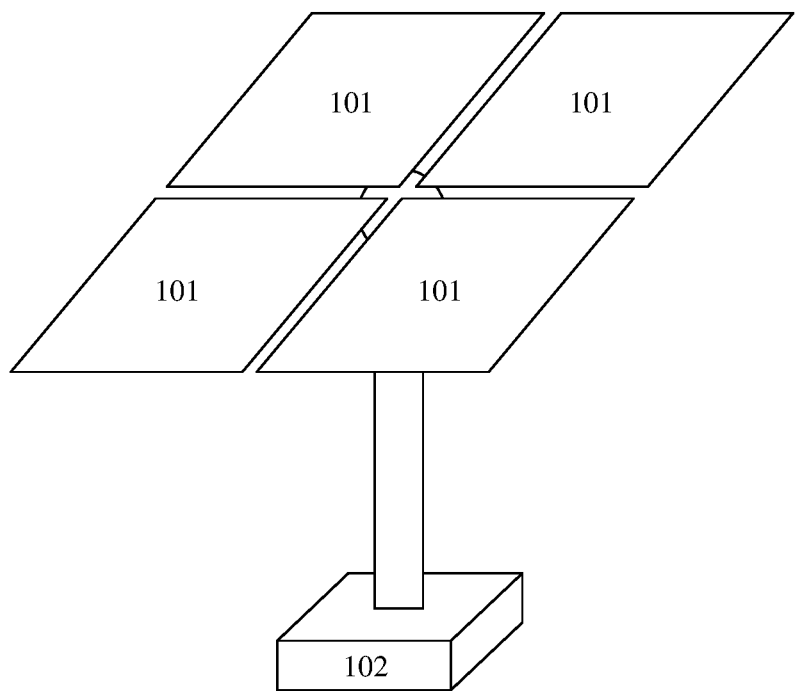
FIG. 2 is a schematic diagram 2 of a photovoltaic module in a photovoltaic plant according to an embodiment of this application.

FIG. 2 is a schematic diagram 2 of a photovoltaic module in a photovoltaic plant according to an embodiment of this application. In some embodiments, the photovoltaic module may include a photovoltaic panel 101 and a photovoltaic tracker 102. A rotation control module may be mounted at a connection between the photovoltaic tracker 102 and the photovoltaic panel 101, and may be a universal rotation module, so that the photovoltaic panel may rotate toward any direction.

The photovoltaic modules shown in FIG. 1 and FIG. 2 may be connected to a grid to transmit electric energy generated by the photovoltaic panel 101. In some cases, the photovoltaic panel 101 may alternatively be connected to the grid by using some direct current-to-alternating current apparatus (such as a transformer or a combiner box). This is not limited in embodiments of this application.

In actual application, the photovoltaic module may alternatively be in another form. Specific structures of the photovoltaic module and the photovoltaic tracker are not limited in embodiments of this application.

Currently, because the photovoltaic plant often suffers from rain and snow, when large-scale snowfall occurs, snow accumulates on the photovoltaic panel 101 shown in FIG. 1 or FIG. 2, thereby damaging the photovoltaic panel 101 and the photovoltaic tracker 102. In a conventional photovoltaic plant, when a worker sees snow falling heavily, the worker may manually send an instruction to the rotation control module 103, so that the rotation control module 103 controls the photovoltaic panel 101 to rotate to a vertical angle or approximately the vertical angle, to cause snow accumulating on the photovoltaic panel 101 to fall off the photovoltaic panel 101. However, in this manner, workload of the worker in the photovoltaic plant is increased. In addition, when heavy snowfall occurs late at night, the worker is in deep sleep, and it is difficult to send an instruction to remove snow accumulating on the photovoltaic panel 101. By the time the worker wakes up in the morning, the accumulating snow may have damaged the photovoltaic panel 101.

In addition, in some photovoltaic plants, a heating apparatus may be mounted at the bottom of the photovoltaic panel 101. When a worker sees snow falling, the worker may turn on a switch of the heating apparatus, so that the heating apparatus heats the photovoltaic panel 101, to melt snow accumulating on the photovoltaic panel 101. In some cases, the heating apparatus may be further connected to a temperature sensor. When the temperature sensor detects a relatively low temperature, the heating apparatus may heat the photovoltaic panel 101 to maintain a temperature. However, such a heating manner is very power-consuming. In a snowfall process, snow continuously falls, and therefore, the heating apparatus needs to continuously melt snow accumulating on the photovoltaic panel 101, which is prone to endless power consumption. In addition, expense of electricity from the grid is high. Therefore, costs of this snow melting manner are very high.

This application provides an automatic snow avoidance system, to resolve a technical problem that a conventional snow removal method of heating has low efficiency and wastes electric energy.

Figure 3:
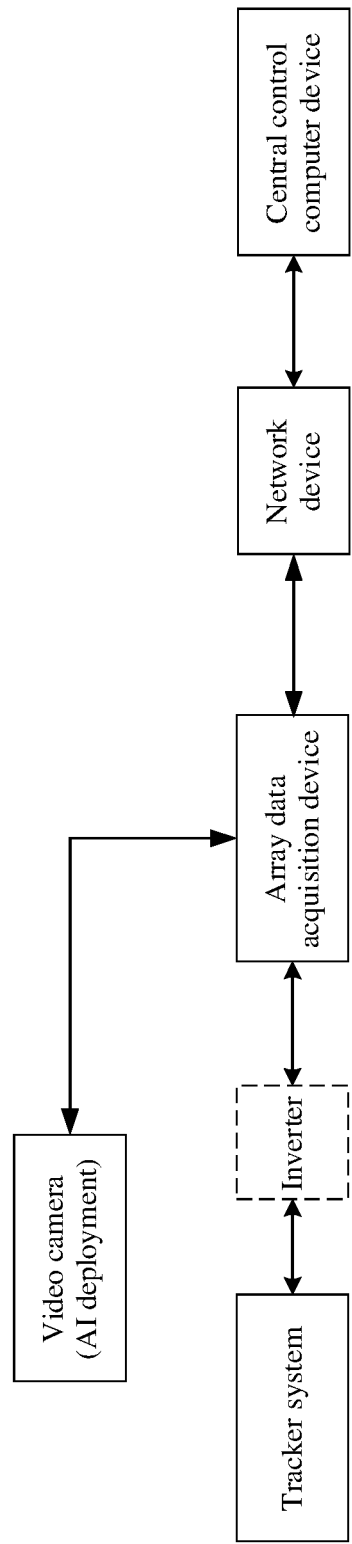
FIG. 3 is a schematic diagram of an automatic snow avoidance system according to this application.

FIG. 3 is a schematic diagram of an automatic snow avoidance system according to this application. The automatic snow avoidance system includes a photovoltaic tracker system, a video camera, an array data acquisition device, a network device, and a central control computer device.

In this embodiment of this application, the photovoltaic tracker system may include the photovoltaic panel 101, the photovoltaic tracker 102, and the rotation control module 103 that are shown in FIG. 1 or FIG. 2. The photovoltaic panel 101, the photovoltaic tracker 102, and the rotation control module 103 are similar to those in the foregoing descriptions, and details are not described herein again. In some embodiments, the photovoltaic tracker system further includes an energy storage apparatus. The energy storage apparatus is connected to the photovoltaic panel 101, and configured to store electric energy generated by the photovoltaic panel 101. The energy storage apparatus may be any apparatus for storing electric energy, for example, a battery or a super-capacitor.

In this embodiment of this application, the photovoltaic tracker system may be coupled to the array data acquisition device by using an inverter. The inverter may convert a direct current signal output by the photovoltaic tracker system into an alternating current signal and transmit the alternating current signal to the array data acquisition device. In some cases, the photovoltaic tracker system may be directly coupled to the array data acquisition device. The photovoltaic tracker system may use a proper connection manner depending on an actual situation. In addition, after the photovoltaic tracker system is coupled to the array data acquisition device (by using the inverter), the array data acquisition device may send an instruction to the photovoltaic tracker system, to control rotation of the photovoltaic panel 101. For example, the array data acquisition device may send an enable signal to the rotation control module 103, so that the rotation control module 103 drives the photovoltaic panel 101 to rotate.

Figure 4:
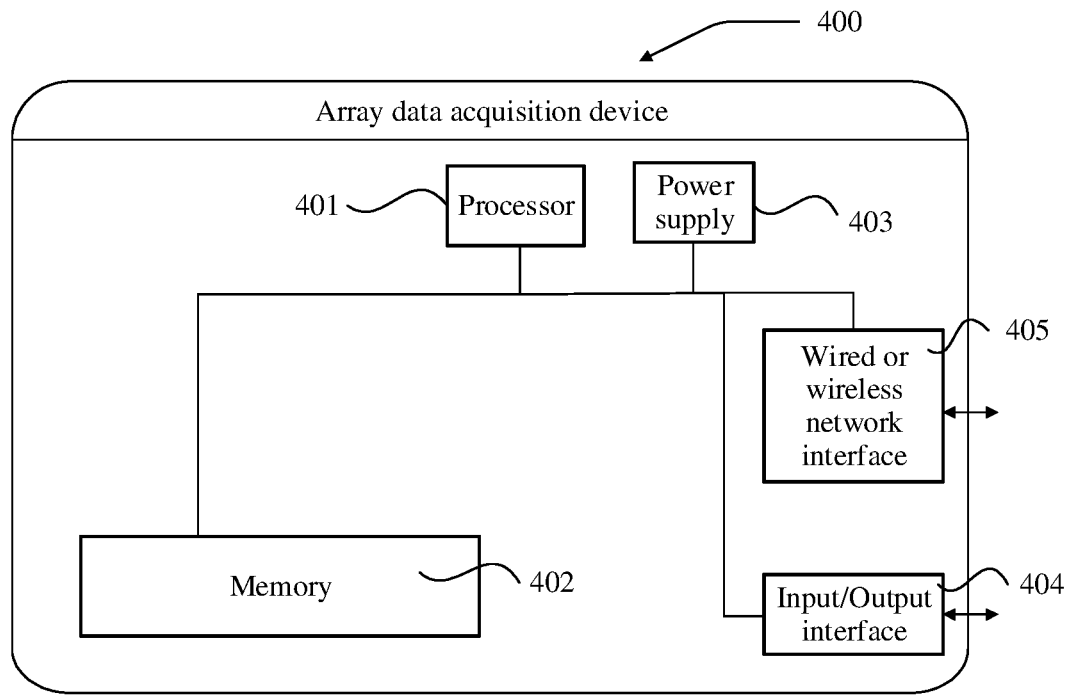
FIG. 4 is a schematic diagram of an array data acquisition device according to an embodiment of this application.

FIG. 4 is a schematic diagram of an array data acquisition device according to an embodiment of this application. In this embodiment of this application, the array data acquisition device 400 may include one or more processors 401, a memory 402, a power supply 403, and an input/output interface 404. The memory 402 may be transient or persistent. The processor 401 is coupled to the memory 402, and may execute a program in the memory 402, so that the array data acquisition device 400 implements steps such as data acquisition, controlling rotation of the photovoltaic panel 101, and uploading data. The power supply 403 may supply power to the array data acquisition device 400. In some embodiments, the array data acquisition device may not have the power supply 403, but may be powered by a current transmitted by the photovoltaic panel 101 (by using the inverter). The input/output interface 404 is connected to the memory 402, and may store acquired data into the memory 402, and may send data stored in the memory 402. In addition, the input/output interface 404 is further connected to the processor 401, and configured to send an instruction of the processor 401, to control rotation of the photovoltaic panel 101. For example, the input/output interface 404 may be an RS485 interface, a network interface, or a wireless interface (LORA, ZIGBEE, or the like). This is not limited in this embodiment of this application. In some embodiments, the array data acquisition device 400 may further include a wired or wireless network interface 405. The array data acquisition device 400 may be connected to the photovoltaic tracker system, the video camera, or the network device by using the wired or wireless network interface 405. A function of the wired or wireless network interface 405 is similar to a function of the input/output interface 404, and details are not described herein again.

Figure 5:
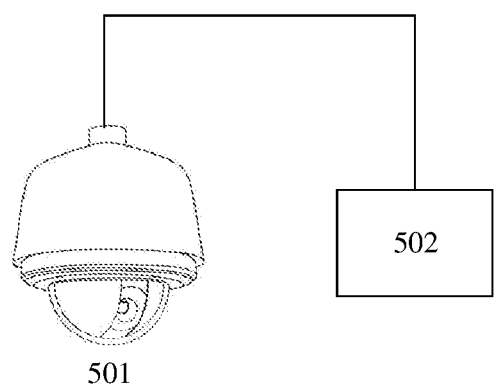
FIG. 5 is a schematic diagram of a video camera according to an embodiment of this application.

In this embodiment of this application, the array data acquisition device is further connected to the video camera. The video camera may shoot a picture related to the photovoltaic tracker system, for example, a picture including the photovoltaic panel 101, a picture of surroundings of a photovoltaic plant, or a picture of ground of the photovoltaic plant. The picture shot by the video camera is not limited in this embodiment of this application. FIG. 5 is a schematic diagram of a video camera according to an embodiment of this application. The video camera may include a camera body 501 and a controller 502. A picture shot by the camera body 501 may be transmitted to the controller 502 for processing. In some embodiments, the camera body 501 may be a camera having an infrared photography function, to shot a picture at night. In some embodiments, the camera body 501 may be further provided with an illumination lamp to illuminate a shot picture at night. In actual application, the camera body 501 may alternatively shoot a picture at night in another manner. This is not limited in this embodiment of this application.

Figure 6:
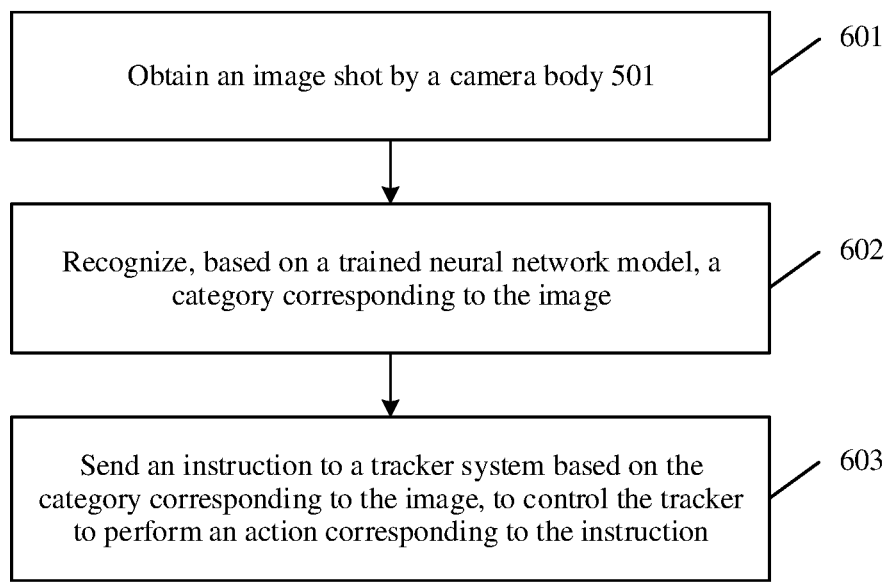
FIG. 6 is a flowchart of steps performed by a controller according to an embodiment of this application.

FIG. 6 is a flowchart of steps performed by a controller according to an embodiment of this application. Specifically, the controller 502 may perform the following steps:

601. Obtain an image shot by the camera body 501.

In this embodiment of this application, the controller 502 is coupled to the camera body 501, to obtain the image shot by the camera body 501.

In some embodiments, the controller 502 may first obtain video data shot by the camera body 501, and then extract several images from the video data based on a preset rule. For example, the controller 502 may perform frame extraction on the video data at a specific time interval t. For example, 30 s is selected as an interval to perform frame extraction, and about 120 images can be extracted from video data of one hour.

In some embodiments, after the controller 502 obtains images shot by the camera body 501, the controller 502 may further filter the images, that is, remove, based on overall brightness or black part proportions of the images, images that have poor quality and that correspond to nighttime and early morning, and leave an image with specific brightness.

602. Recognize, based on a trained neural network model, a category corresponding to the image.

In this embodiment of this application, the controller 502 may pre-train a neural network model to obtain the trained neural network model. A specific training process is not limited in this embodiment of this application. A possible training process provided in this embodiment of this application is as follows:

The controller 502 first obtains an image for training. An obtaining method is similar to that in step 601, and details are not described herein again. Then, a manager performs classification and marking on the image. A specific category may include a weather category or the like. The weather category includes a plurality of categories such as cloudy, sunny, rainy, snowy, and hailing. The manager may classify the image when observing a specific condition of the image. In some embodiments, the controller 502 may perform temporal classification on the image, and determine, based on a time at which the image is shot, whether a category corresponding to the image is daytime or nighttime. For example, 6:00 to 19:00 are daytime, and other time periods are nighttime. Then, the controller 502 may perform temporal classification on the image based on this rule. In some embodiments, if the neural network is required to further recognize accumulating snow and accumulating dust, the manager may perform corresponding classification and marking on the image. A snow accumulation category includes but is not limited to three categories: full coverage, partial coverage, and no coverage. A dust accumulation category includes but is not limited to three categories: serious dust accumulation, general dust accumulation, and slight dust accumulation. In actual application, more finer categories may be further set for image classification based on an actual requirement. This is not limited in this embodiment of this application.

The controller 502 may obtain classified images, and then divide the classified images into two parts: one is a training set and the other is a verification set. For example, if there are N classified images, the controller 502 may randomly select n images (for example, n is 10% of N) as the verification set, and use other images as the training set.

Then, the controller 502 trains an initial neural network model based on the training set, to obtain a trained neural network model. The controller 502 may select a neural network with a proper size and whose accuracy is verified to be high as a to-be-trained model, and perform model training by using a training policy (including a learning rate, an optimizer, a mixed loss, and the like) verified to be good, to obtain a trained neural network model. A specific training process is not described in this embodiment of this application.

In some embodiments, the automatic snow avoidance system further includes a cloud training system. The training set and the verification set may be uploaded to the cloud training system. The cloud training system trains the neural network model, and then delivers the trained model to the controller 502. This manner of training the neural network model by using the cloud training system can reduce design costs of the controller.

In some embodiments, the controller 502 may randomly select some of daytime images as a verification set and use remaining images as a training set to train a first neural network, randomly select some of nighttime images as a verification set and use remaining images as a training set to train a second neural network, and finally recognize a daytime image by using the obtained first neural network and recognize a nighttime image by using the obtained second neural network.

For the trained neural network, the controller 502 may further verify the neural network model by using the verification set. For example, the controller 502 may perform classification recognition on an image in the verification set by using the trained neural network model, and compare an obtained classification result with a classification result in the verification set. If an accuracy rate reaches a preset value, it indicates that a training effect of the neural network model is relatively good, and verification succeeds.

In some embodiments, the controller 502 may further perform transfer learning. In an early stage of model training, transfer learning needs to be supported when a generalization effect of the model is not high because an amount of obtained video data of the photovoltaic plant is relatively small. A transfer learning method is to select X pieces of each category from a non-verified part of new plant data and mix them with original data by an equal proportion for FT, and then perform inference based on an original verification set. The neural network model used in photovoltaic plant may be updated by a model obtained after the transfer learning, to improve a recognition accuracy rate.

Therefore, in this embodiment of this application, the controller 502 may obtain, through recognition by using the trained neural network model, the category corresponding to the image. For example, a category of an image 1 is daytime and snowfall, and a category of an image 2 is daytime and rainy.

603. Send an instruction to the photovoltaic tracker system based on the category corresponding to the image, to control the photovoltaic tracker to perform an action corresponding to the instruction.

In this embodiment of this application, the controller 502 may determine, based on the category corresponding to the image and with reference to a preset determining condition, whether to send a bracket adjustment instruction to the photovoltaic tracker system. The preset determining condition is not limited in this embodiment of this application. A preset determining condition provided in this embodiment of this application is shown in FIG. 7.

Figure 7:
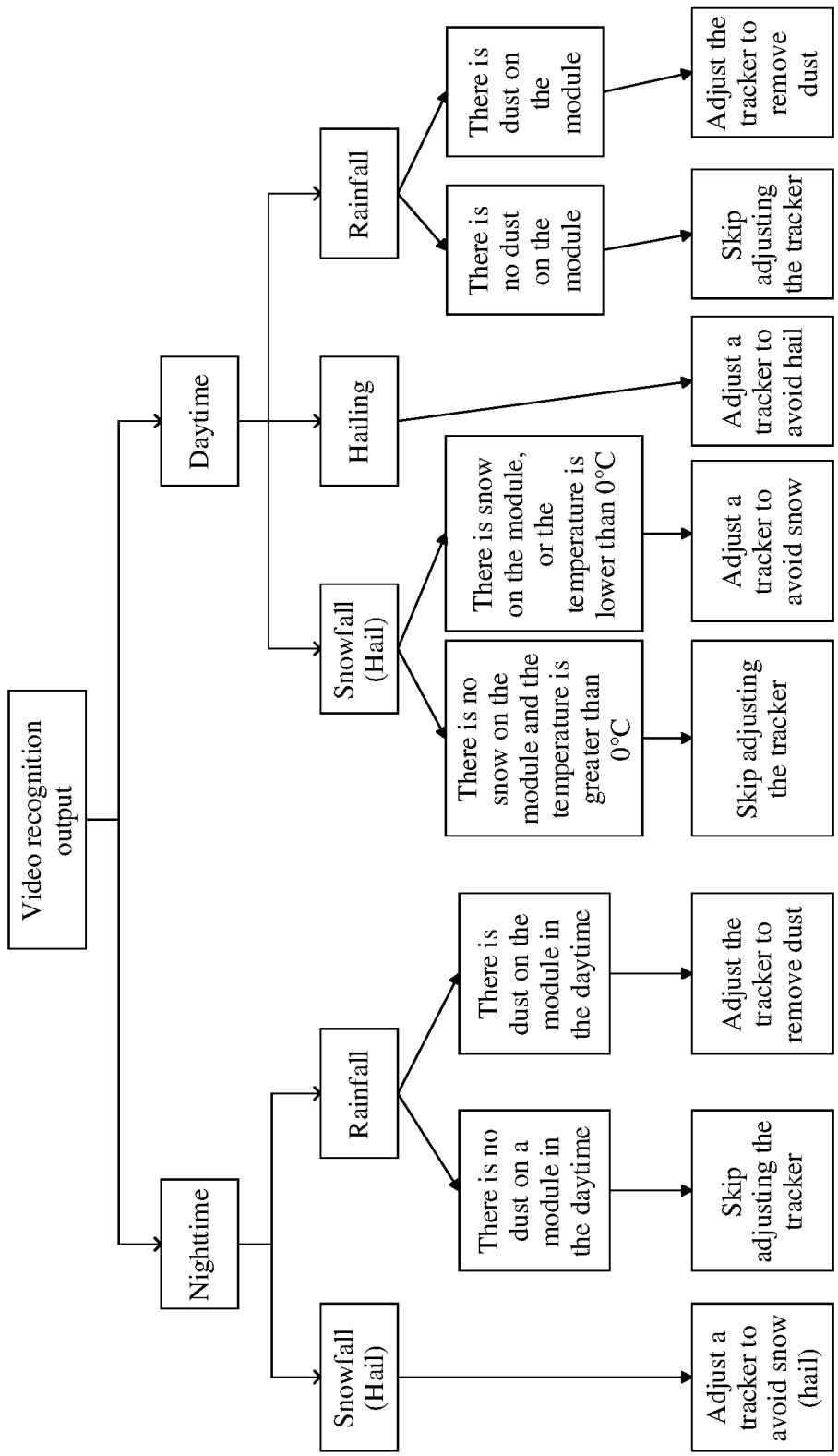
FIG. 7 is a schematic diagram of a determining condition preset by a controller 502 according to an embodiment of this application.

FIG. 7 is a schematic diagram of a determining condition preset by the controller 502 according to an embodiment of this application. When the category corresponding to the image meets a corresponding determining condition, the controller 502 sends a corresponding instruction to enable the photovoltaic tracker to perform corresponding adjustment. For example, when the category corresponding to the image meets nighttime and snowfall, the controller 502 sends a bracket adjustment instruction to the photovoltaic tracker system, so that the photovoltaic tracker system adjusts the bracket to avoid snow. For another example, when the category corresponding to the image is daytime, rainy, and dust accumulation, the controller 502 may send a bracket adjustment instruction to the photovoltaic tracker system, so that the photovoltaic tracker system adjusts the bracket to remove dust. In actual application, the determining condition may alternatively be specifically set based on an actual requirement. This is not limited in this embodiment of this application.

In this embodiment of this application, there are a plurality of bracket adjustment instructions, which respectively correspond to different adjustment manners. For example, during snowfall at night, the controller 502 may select a tilt manner of a downwind direction closest to a wind direction based on historical and current wind direction data (the data may be obtained from a data acquisition module, and the data acquisition module may be a wind direction sensor or the like), and control a tilt angle of the bracket to a maximum tilt angle mode, to reduce a vertical receiving area of snowfall. That is, the controller 502 may send an instruction with the tilt angle of the bracket (a first type of bracket adjustment instruction) to the photovoltaic tracker system, so that the photovoltaic tracker system selects the tilt manner of the downwind direction closest to the wind direction, and controls the tilt angle of the bracket to the maximum tilt angle mode, to reduce the vertical receiving area of snowfall. For another example, when the video is recognized as a nighttime state and rainy (generally heavier than moderate rain during marking), if dust was recognized on a module surface in daytime, the controller 502 may send a second type of bracket adjustment instruction to the photovoltaic tracker system. The second type of bracket adjustment instruction is used to instruct the photovoltaic tracker system to adjust the bracket to repeatedly rotate toward the east and west at a maximum angle X times, to clear the dust on the module surface in combination with rainwater. In actual application, the controller 502 may negotiate with the photovoltaic tracker system to design more types of bracket adjustment instructions and corresponding adjustment actions, to implement corresponding adjustment effects. This is not limited in this embodiment of this application.

In the automatic snow avoidance system shown in FIG. 3, the array data acquisition device may be further coupled to the central control computer device by using the network device. The network device may be a device such as a router, an access point, or a network data center. This is not limited in this embodiment of this application. The central control computer device may be a personal computer (PC) or another device with a processor and a memory. This is not limited in this embodiment of this application.

In some embodiments, the central control computer device may be provided with a display screen to display a current detailed state of the photovoltaic tracker system, or display a current picture shot by the video camera. In some embodiments, the manager may manually control the photovoltaic tracker system by using the central control computer device to adjust the bracket, to perform manual intervention for a system error in determining or an abnormality.

Figure 8:
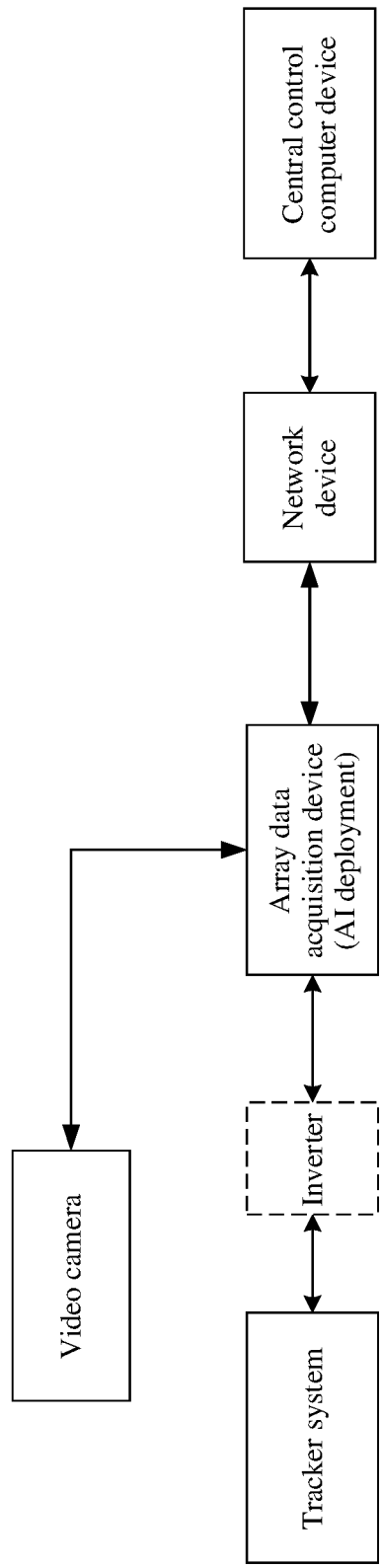
FIG. 8 is a schematic diagram of another automatic snow avoidance system according to an embodiment of this application.

FIG. 8 is a schematic diagram of another automatic snow avoidance system according to an embodiment of this application. The automatic snow avoidance system includes a photovoltaic tracker system, a video camera, an array data acquisition device, a network device, and a central control computer device.

In the automatic snow avoidance system shown in FIG. 8, the video camera outputs video data to the array data acquisition device. A controller is deployed on the array data acquisition device, and the controller may perform steps performed by the controller 502 in the foregoing embodiment. Details are not described again in this embodiment of this application.

In the automatic snow avoidance system shown in FIG. 8, the photovoltaic tracker system, the network device, and the central control computer device are similar to those in the foregoing embodiment, and details are not described herein again.

In some embodiments, the automatic snow avoidance system further includes an inverter. The inverter is similar to the inverter in the foregoing embodiments, and details are not described herein again.

In this embodiment of this application, the controller is deployed on the array data acquisition device rather than the video camera, making it unnecessary to purchase a video camera with a controller so that costs of the video camera can be reduced, and unnecessary to mount the controller on a common video camera. The controller may be disposed on the array data acquisition device, so that module design is easier. In addition, the video camera is usually disposed outdoors, and is relatively easy to be damaged. Therefore, deploying the controller on the array data acquisition device facilitates protection of the controller.

Figure 9:
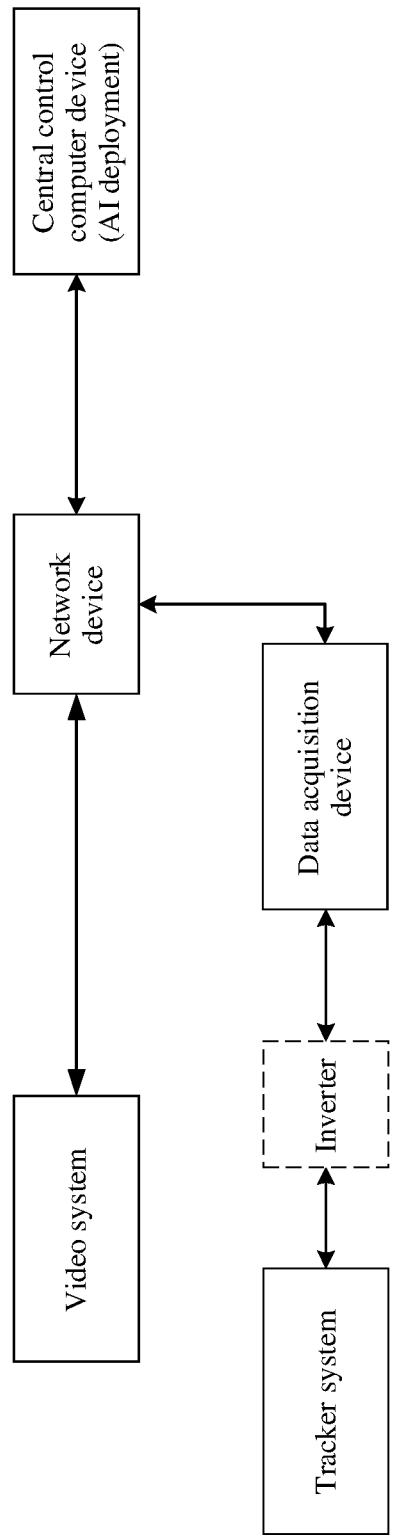
FIG. 9 is a schematic diagram of another automatic snow avoidance system according to an embodiment of this application.

FIG. 9 is a schematic diagram of another automatic snow avoidance system according to an embodiment of this application. The automatic snow avoidance system includes a photovoltaic tracker system, a video system, a data acquisition device, a network device, and a central control computer device.

In the automatic snow avoidance system shown in FIG. 9, the video system may include a video camera. The video camera is similar to the video camera in the embodiment corresponding to FIG. 8, and details are not described herein again. In the automatic snow avoidance system shown in FIG. 9, the photovoltaic tracker system and the network device are similar to those in the foregoing embodiment, and details are not described herein again. The data acquisition device is similar to that in the embodiment corresponding to FIG. 3, and details are not described herein again.

In the automatic snow avoidance system shown in FIG. 9, a controller is deployed in the central control computer device. The controller may perform steps performed by the controller 502 in the foregoing embodiment. Details are not described again in this embodiment of this application. It may be understood that the controller in the central control computer device may obtain, by using the network device, video data uploaded by the video system, and send a related instruction to the photovoltaic tracker system by using the network device and the data acquisition device.

Figure 10:
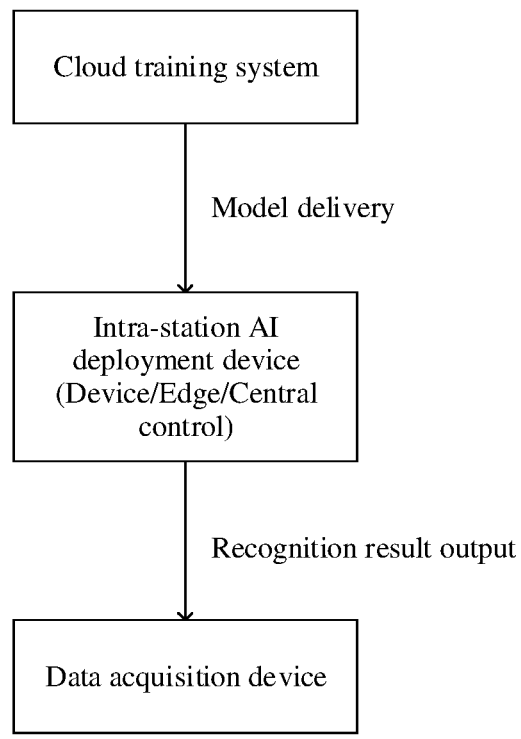
FIG. 10 is a schematic logic diagram of a cloud training system according to an embodiment of this application.

FIG. 10 is a schematic logic diagram of a cloud training system according to an embodiment of this application. In some embodiments, the automatic snow avoidance system further includes a cloud training system. After obtaining a training set and a verification set, the cloud training system obtains a neural network model through training based on the training set and the verification set, and then delivers the neural network model to the controller in the automatic snow avoidance system. A training manner of the cloud training system is similar to the training manner of the neural network model in the foregoing embodiment, and details are not described herein again. After recognizing a result, the controller sends a related instruction to the photovoltaic tracker system by using the data acquisition device (or the array data acquisition device), to adjust the bracket to implement automatic snow avoidance.

In the embodiments of this application, the controller is intended to perform image recognition, and a main function is to process acquired image data or video data, to obtain a corresponding result. The controller may be deployed in the image/video capture apparatus, as shown in FIG. 3, or may be deployed in the data acquisition device, as shown in FIG. 8, or may be deployed in the central control computer device, as shown in FIG. 9. In actual application, the controller may alternatively be deployed at a proper location. This is not limited in this embodiment of this application.

The controller may be implemented in a form of a chip, that is, implemented by an integrated circuit chip or a dedicated chip, or may be implemented in a form of a computer system. The computer system may include hardware and software. The hardware may include a processor, a memory, and the like. The memory stores software. The processor may run the software, to enable the computer system to implement steps and methods implemented by the controller. The following describes some of these controllers in detail.

Figure 11:
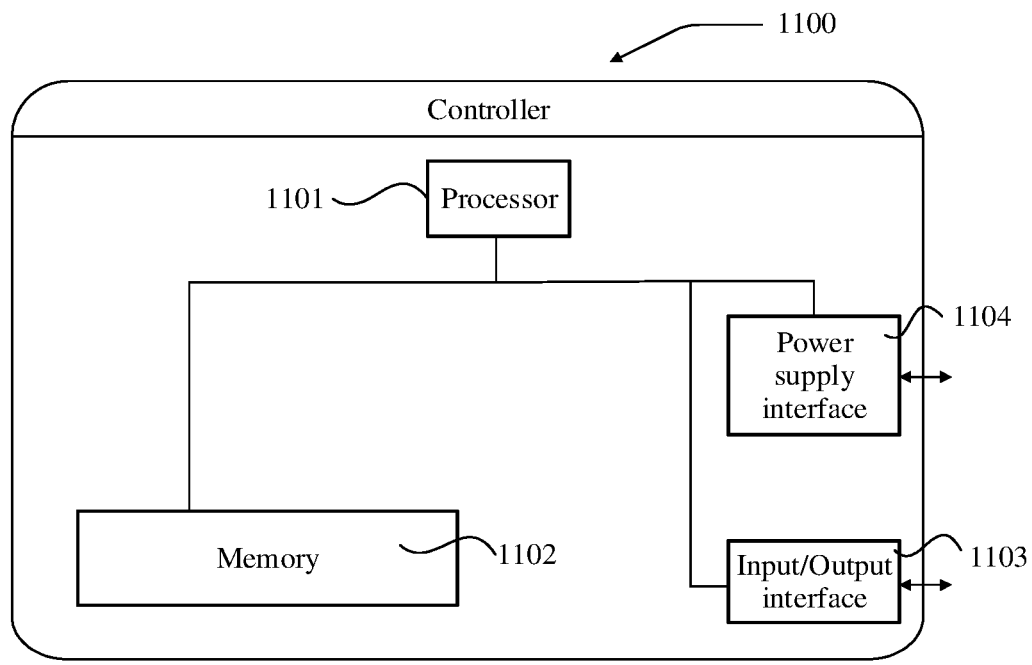
FIG. 11 is a schematic diagram of an internal structure of a controller according to an embodiment of this application.

FIG. 11 is a schematic diagram of an internal structure of a controller according to an embodiment of this application. The controller 1100 includes one or more processors 1101, a memory 1102, and an input/output interface 1103. One or more programs are stored in the memory. The one or more processors 1101 are coupled to the memory 1102, and may execute a program in the memory 1102, to enable the controller to implement step 601, step 602, and step 603 in the foregoing embodiment by using the input/output interface 1103. In some embodiments, the controller 1100 further includes a power supply interface 1104, configured to supply power to the controller 1100.

Figure 12:
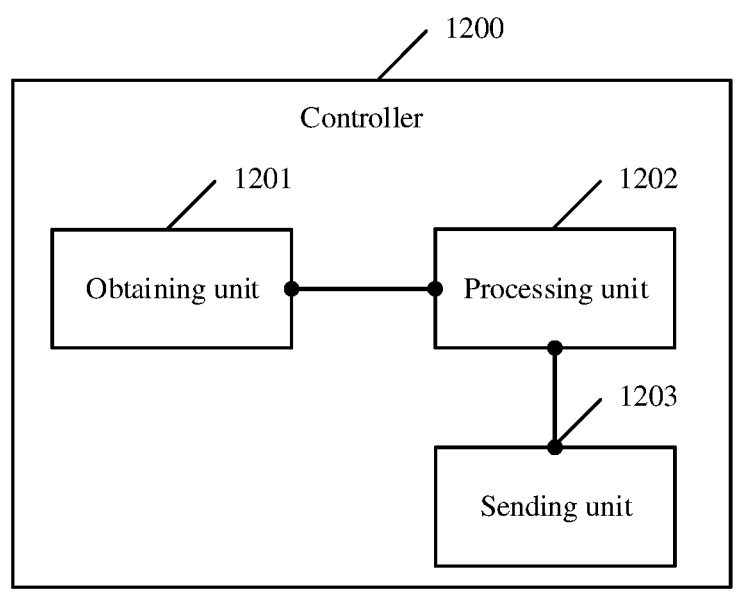
FIG. 12 is a schematic diagram of another controller according to an embodiment of this application.

FIG. 12 is a schematic diagram of another controller according to an embodiment of this application. The controller 1200 includes an obtaining unit 1201, a processing unit 1202, and a sending unit 1203. The obtaining unit 1201 may perform step 601 in the embodiment corresponding to FIG. 6, the processing unit may perform step 602 in the embodiment corresponding to FIG. 6, and the sending unit may perform step 603 in the embodiment corresponding to FIG. 6.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A method comprising:
   obtaining image data related to a photovoltaic panel or environment around the photovoltaic panel, the photovoltaic panel being mounted on a photovoltaic tracker, and rotatable with the photovoltaic tracker, wherein obtaining the image data comprises:
   obtaining daytime images and nighttime images;
   selecting first images from the daytime images as a first verification set and using remaining daytime images as a first training set;
   selecting second images from the nighttime images as a second verification set and using remaining nighttime images as a second training set;
   training a first neural network using the first training set;
   training a second neural network using the second training set; and
   classifying a received image as a daytime image or nighttime image and processing the received image using the first neural network or the second neural network based on the classification; and
   generating, based on a category corresponding to the processed image from the first neural network or the second neural network, an instruction of a plurality of instructions to control rotation of the photovoltaic tracker, to move the photovoltaic panel in a corresponding manner, the plurality of instructions corresponding to different image data categories.

2. The method according to claim 1, wherein generating the instruction comprises:
   based on the category corresponding to the image data being snowfall or hailing, generating a first instruction to instruct the photovoltaic tracker to adjust to a preset tilt angle.

3. The method according to claim 1, wherein generating the instruction comprises:
   based on the category corresponding to the image data being rainfall and dust accumulation, generating a second instruction to instruct the photovoltaic tracker to rotate to a preset angle or to rotate n times, and n is an integer greater than or equal to 1.

4. The method according to claim 1, further comprising:
   obtaining video data; and
   extracting the image data from the video data at a preset time interval.

5. The method according to claim 1, further comprising:
   removing the image data when image brightness of the image data is less than a preset threshold.

6. The method according to claim 1, wherein training the first neural network and the second neural network comprises:
   classifying each image in the first training set and the second training set into one of a plurality of weather categories, wherein the weather categories comprise cloudy, sunny, rainy, snowy, and hailing; and
   determining, for each classified image, a degree of condition coverage selected from a plurality of coverage levels.

7. The method according to claim 1, wherein processing the image data comprises:
   filtering the image data based on overall brightness and black part proportions to remove images having poor quality; and
   performing image recognition using the trained first neural network or second neural network to determine a weather condition category for filtered images.

8. The method according to claim 1, further comprising:
   determining a time at which each image is captured;
   classifying each image as daytime or nighttime based on the time, wherein daytime comprises a predetermined time period; and
   selecting images for processing based on the daytime or nighttime classification.

9. The method according to claim 1, wherein each different image data category corresponds to a specific tracker rotation angle and rotation sequence.

10. A method comprising:
    obtaining image data related to a photovoltaic panel or environment around the photovoltaic panel, the photovoltaic panel being mounted on a photovoltaic tracker, and rotatable with the photovoltaic tracker, wherein obtaining the image data comprises:
    obtaining a plurality of images using an image capture device;
    classifying and marking the plurality of images to create a training set and a verification set;
    uploading the training set and the verification set to a cloud training system;

training, by the cloud training system, a neural network model using the training set;
receiving the trained neural network model from the cloud training system at a local controller; and
processing subsequently captured images using the trained neural network model at the local controller; and
generating, based on a category corresponding to the processed image from the trained neural network model, an instruction of a plurality of instructions to control rotation of the photovoltaic tracker, to move the photovoltaic panel in a corresponding manner, the plurality of instructions corresponding to different image data categories.

11. The method according to claim 10, wherein classifying and marking the plurality of images comprises: classifying each image into one of a plurality of weather categories, wherein the weather categories comprise cloudy, sunny, rainy, snowy, and hailing; and classifying each image into one of a plurality of temporal categories, wherein the temporal categories comprise daytime and nighttime based on a time at which each image is captured.

12. The method according to claim 10, wherein the training set and verification set are created by: selecting a predetermined percentage of the plurality of images as the verification set; and using remaining images of the plurality of images as the training set.

13. The method according to claim 10, further comprising: filtering the plurality of images prior to creating the training set and verification set by removing images based on overall brightness and black part proportions to remove images having poor quality and corresponding to nighttime and early morning conditions.

14. The method according to claim 10, wherein obtaining the plurality of images comprises:
obtaining video data from the image capture device; and
extracting images from the video data at a preset time interval, wherein the preset time interval is selected to obtain a predetermined number of images per hour.

15. The method according to claim 10, wherein generating the instruction comprises:
based on the category corresponding to the processed image being nighttime and snowfall, generating a first instruction to adjust the photovoltaic tracker to a maximum tilt angle in a downwind direction determined based on current wind direction data.

16. The method according to claim 10, wherein generating the instruction comprises:
based on the category corresponding to the processed image being nighttime and rainfall with dust accumulation recognized during daytime, generating a second instruction to adjust the photovoltaic tracker to repeatedly rotate toward east and west at a maximum angle for a predetermined number of times.

17. A method comprising:
obtaining image data related to a photovoltaic panel or environment around the photovoltaic panel, the photovoltaic panel being mounted on a photovoltaic tracker and rotatable with the photovoltaic tracker, wherein obtaining the image data comprises:
obtaining a plurality of images of the photovoltaic panel;
filtering the plurality of images based on overall brightness and black part proportions to remove images having poor quality and corresponding to nighttime and early morning conditions;
performing transfer learning by:
selecting a predetermined number of images from each category of obtained images;
mixing the selected images with existing training data in equal proportion; and
updating a neural network model based on the mixed images; and
generating, based on a category corresponding to processed image data from the updated neural network model, an instruction of a plurality of instructions to control rotation of the photovoltaic tracker, to move the photovoltaic panel in a corresponding manner, the plurality of instructions corresponding to different image data categories.

18. The method according to claim 17, wherein performing the transfer learning comprises:
performing inference based on an original verification set after mixing the selected images with the existing training data; and
updating the neural network model with a model obtained after the transfer learning to improve recognition accuracy.

19. The method according to claim 17, further comprising:
classifying each image into a weather category, wherein the weather categories comprise cloudy, sunny, rainy, snowy, and hailing; and
determining, for each classified image, whether the image corresponds to daytime or nighttime based on a time at which the image was captured.

20. The method according to claim 17, wherein filtering the plurality of images comprises:
obtaining video data from an image capture device;
extracting images from the video data at a specific time interval; and
removing extracted images having poor quality based on the overall brightness and black part proportions.

* * * * *